Figure 1:
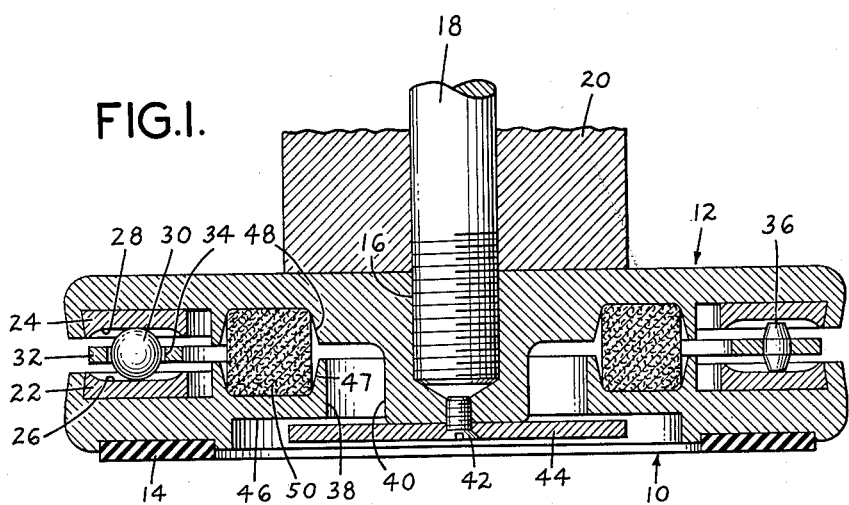

Sept. 1, 1964  W. A. KEETCH  3,146,979

SHOCK AND VIBRATION ISOLATOR FOR MACHINERY AND THE LIKE

Filed July 24, 1961

United States Patent Office 3,146,979
Patented Sept. 1, 1964

3,146,979
SHOCK AND VIBRATION ISOLATOR FOR
MACHINERY AND THE LIKE
William A. Keetch, Ridgewood, N.J., assignor to Robinson Technical Products, Inc., Teterboro, N.J., a corporation of New York
Filed July 24, 1961, Ser. No. 126,138
3 Claims. (Cl. 248—20)

The present invention relates to shock and vibration isolation mountings for machinery and the like. More particularly it relates to mountings which react to the horizontal component of forces by permitting, within limits, relatively free, substantially horizontal movement in all directions between the supported load and the floor, and which include means for converting a major portion of all such movements into upward displacement of the supported load. The energy expended in lifting the load is effective to reduce the magnitude of horizontal displacement in response to any given force. The ratio of magnitude of vertical displacement to magnitude of horizontal displacement may be chosen with regard to the problem presented by a particular installation and in many instances the mounting may be so designed that such ratio is not constant. For example, the rate of vertical displacement may be increased as horizontal displacement increases whereby relatively light forces may be gently resisted and relatively greater forces may meet rapidly increasing resistance. In this manner the maximum horizontal displacement may be limited to permissible magnitude for large shock forces without reducing sensitivity of the mounting for isolation of relatively small shocks or vibrations.

The mountings of the present invention may be combined with or have built into them suitable devices for the isolation of the vertical components of shock or vibratory forces. The particular form of such combined or added devices will, of course, depend upon the circumstances of use and no attempt will be made herein to describe anything other than simple, illustrative structures.

The embodiment of the present invention illustrated herein is one which is particularly adapted for the support of machinery and the like which is subjected to shock and/or vibratory forces which have relatively large horizontal components. Such shock or vibratory forces may be produced by the machine or they may be exerted upon a floor or other structure upon which the machine may rest. In either event the mounting of the present invention will be effective to convert severe and sudden horizontal forces into vertical forces which are relatively slowly expended in the lifting of the machine whereby the forces ultimately transmitted to the floor or to the machine will be relatively unobjectionable. It is a particular feature of the present invention that in the case of a machine which produces horizontal shock or vibratory forces the present invention makes it unnecessary to bolt or otherwise secure the machine to the floor. The conversion of a major portion of the horizontal forces to vertical forces eliminates the tendency of such machines to "walk."

The illustrated embodiment of the present invention makes use of a circular array of bearing balls disposed between two circular raceways located respectively in a base plate, adapted to rest on the floor, and a load supporting plate upon which the machine, or one of the legs or other portions thereof rests. The raceways are so shaped in cross-section radially of the circle of balls as to provide a low point, which may include a flat or relatively flat portion if so desired, centrally of the raceways and high points at the inner and outer edges of the raceways with curved or inclined portions joining the low and high points. The width of the raceways is considerably greater than the diameter of the individual bearing balls and the base plate and load supporting plate have clearances to permit relative horizontal movement whereby any force applied in any generally horizontal direction to either plate will cause the balls to roll transversely, in varying degrees, of the raceways. In so rolling the balls will force the load supporting plate and the load thereon to move upwardly, thereby converting the major portion of the horizontal component of such force into an upwardly exerted force as discussed above.

The characteristics of a particular mounting required for a particular set of circumstances may be established by the selection of the shape and degree of curvature or inclination of the sides of the raceways. In addition, the mountings may be provided with damping or cushioning means to further modify the essential characteristics.

Figure 2:
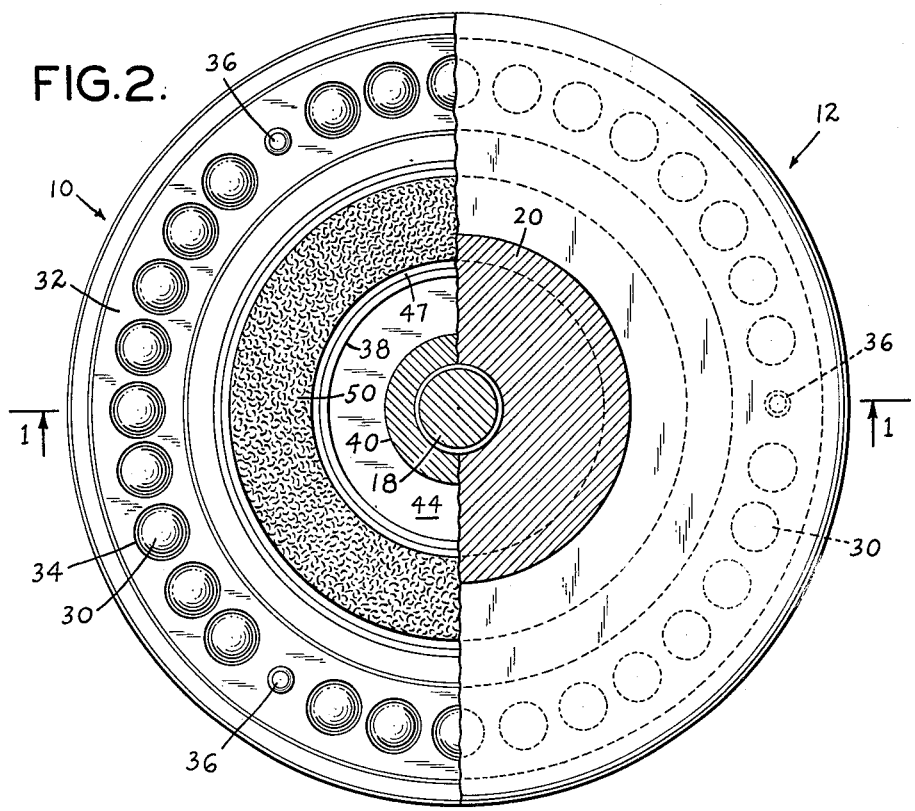

In the drawings:

FIG. 1 is a vertical sectional view of an illustrative mounting embodying the present invention, the section being taken along the line 1—1 in FIG. 2; and FIG. 2 is a plan view, with parts broken away, of the same.

Referring now to the drawings, there is shown a support embodying the present invention in which there is a base plate 10 and a load supporting plate 12. The base plate 10 may be provided with an annular ring 14 of somewhat resilient material to establish firm frictional contact with the floor upon which the support is to rest. For example, the ring 14 may be made of a material similar to that used for automotive brake linings. Furthermore, when desired, the ring 14 may be made of material which is sufficiently resilient or which has such damping characteristics as to absorb or isolate vertical vibrations and shocks which may be encountered. The load supporting plate may be provided with any suitable means for attachment to the foot or base of the machine or other object to be supported. For example, the load supporting plate may be provided with a centrally located threaded hole 16 to receive a screw or stud 18 which in turn may be secured to the foot or other portion 20 of the supported object.

The plates 10 and 12 are provided respectively with race rings 22 and 24 which extend circumferentially of the plates and are provided with inwardly curved, oppositely disposed raceways 26 and 28. A suitable number of bearing balls 30 are disposed between the race rings 22 and 24, and extend throughout the circumference of the raceways. Preferably the balls 30 are arranged in a retainer or spacing ring 32 which may be of any well-known type which includes retaining means (not shown). For simplicity and economy, the ring 32 may take the form shown in the drawings wherein holes 34 of a diameter to form a free fit with the balls 30 are spaced around the ring to hold the balls 30 in spaced relation. The ring 32 may be provided with pins or similar protuberances 36 which extend above and below the plate 32. The total vertical dimension between the tips of the pins or protuberances 36 is somewhat less than the diameter of the balls 30 whereby the tips of the pins 36 may rest, or impinge, upon one or the other of the raceways 26 or 28 without interfering with the movement of the balls. The pins 36 are thus effective at all times to maintain the ring 32 at a level sufficiently close to the horizontal axis of the balls 30 to prevent dislodgment of any of the balls 30 from the ring 32.

The base plate 10 is provided with an enlarged centrally disposed circular opening 38. The load supporting plate 12 is provided with a centrally disposed boss 40 which is arranged to extend downwardly into the opening 38 in the base plate 10. The diameter of the boss 40 is smaller than that of the opening 38 to provide a stop means permitting only a predetermined maximum amount of horizontal displacement of the plate 12 relative to the base plate 10. The boss 40 on load supporting plate 12 has secured thereto, as by a screw 42, a keeper plate 44 which is of larger diameter than that of the opening 38 in the base plate 10. The base plate 10 is provided with a recess 46 to receive the keeper plate 44 and the diameter of the recess 46 is greater than that of the keeper plate 44 to permit substantially the same amount of limited horizontal displacement of the plate 12 relative to the plate 10 as that mentioned above in connection with the boss 40 and opening 38. The keeper plate 44 and the boss 40 are of such dimensions that the lower surface of the keeper plate will lie somewhat above, and thus out of contact with, the floor upon which the base plate 10 is to rest. Also, the recess 46 is of such a depth as to provide definite and limited vertical clearance between the horizontal surface of the recess 46 and the upper surface of the keeper plate 44. The primary purpose of the keeper plate 44 is to hold the device in assembled condition for packing, shipping and installation although, if so desired, such a plate may be utilized to indirectly limit the extent of relative horizontal movement between the plates 10 and 12, in which event the other horizontal clearances discussed above need not be relied upon for such limitation.

As noted above, the raceways 26 and 28 are curved inwardly away from one another. The curvature, along a radial cross-section view as shown in FIGURE 1, may be uniform and thus may comprise a fragment of a circle of relatively large diameter or, if preferred, the curvature may be flat or relatively flat in the central portion and progressively sharper towards the opposite edges of the race rings. The changing curvature may be produced by using two or more different radii or differently inclined portions or may be calculated according to a suitable exponential formula. In any event the central portion, at least, of the curve should be substantially flatter than the curvature of the surfaces of the balls 30 so that the balls may roll transversely of the raceways. Preferably the curvatures of the raceways 26 and 28 are symmetrical and identical.

When a load is placed upon the load carrying plate 12 a vertical force will be transmitted through the plate 12 and upper race ring 24 to the balls 30, and then to the lower race ring 22 and base plate 10. Due to the curvature of the raceways 26 and 28 the balls 30 will automatically center upon the lowest point in the curvature of the lower raceway 26 and the highest point in the curvature of the upper raceway 28. Upon the application of a horizontal force to the load carrying plate 12 or the load carried thereby, displacement of the plate 12 relative to the base plate 10 will occur due to the fact that the balls 30 are free to roll to a limited extent transversely of the raceways 26 and 28. For example, referring to the sectional view in FIGURE 1, the ball 30 at the left-hand side of the figure will roll toward the right when a horizontal force is applied toward the right and along the radial axis on which this particular ball 30 is located. As the ball 30 rolls toward the right it must ascend the incline on the right-hand side of the raceway 26. At the same time the ball, in effect, will be rolling toward the left-hand side of the upper raceway 28 and will be ascending the incline in that raceway. Thus, upon such horizontal displacement, the ball 30 will lift the plate 12 vertically to the extent and at the rate established by the inclines in both raceways.

While attention has been focused upon a single ball 30 in the immediately preceding portion of the description, it is apparent that any force which has a horizontal component and is applied to the load carrying plate 12 or the load supported thereby, will cause a displacement of the plate 12 in some horizontal direction and that all of the balls 30 will be displaced in this same direction with consequent elevation of the load carrying plate 12. It will be understood, therefore, that any shock or vibration from any direction which would tend to cause horizontal movement between the base plate 10 and the load supporting plate 12 will be expended, in large measure, in lifting the weight of the machine or other load carried on the supporting plate 12.

If the raceways 26 and 28 are merely inclined or are of uniform curvature, that is, if their cross-section constitutes a portion of a large circle, the resistance to lateral displacement will be linear or substantially so. However, if the curvature of the raceways is made progressively steeper toward the outer edges as discussed above, increased horizontal displacement due to greater shocks will be increasingly resisted by the increased rate of rise of the load relative to the floor. Thus, it will be apparent that the device of the present invention may be designed for optimum performance with the particular device to be supported and the particular nature of the shocks or vibratory forces to which it may be subjected.

For example, a loom for the weaving of fabrics and similar materials is a very heavy structure in which severe forces are developed in the setting of the shuttles into flight and the homing of the shuttles in the shuttle boxes. These forces are in a generally horizontal direction transversely of the loom. The swinging of the lay and banging of the reed against the fabric causes shock forces which are generally horizontal and in a direction fore and aft of the loom. Accordingly, it has been the practice to bolt looms securely to the floor whereby the forces just mentioned are directly transmitted to the floor of the building. When an appropriate number of properly designed devices of the present invention are used to support a loom it is not necessary to secure the loom to the floor because the loom is free for horizontal movement relative to the floor within the limits established by the supporting devices of the present invention. When the loom is operated the forces which have horizontal components and which would tend to make the loom "walk" across the floor are expended in moving the loom horizontally and in lifting the great weight of the loom vertically over a period of time which is much greater than the period of time in which the shock force is developed. The forces ultimately transmitted to the floor through the base plates 10 and the frictional and/or resilient rings 14 are accordingly much reduced in severity and are transmitted in a predominantly vertical direction.

The characteristics of the device of the present invention may be further advantageously enhanced by the provision of yieldable means for cushioning and/or damping to modify or control the movement between the plates 10 and 12. Such a means may be selected to offer further resistance to horizontal displacement or to modify the resonance of the mounting, or it may be utilized to support a substantial portion of the vertical load, or it may be selected to perform any combination of such functions. For example, as shown in the drawings, the base plate 10 may be provided with an annular recess 47 and the load supporting plate 12 may be provided with a corresponding annular recess 48 adapted to receive an annular ring 50 of material having the desired cushioning or cushioning and damping characteristics. For certain purposes the ring 50 may be made of rubber or synthetic rubber or other suitable natural or synthetic elastomers. Preferably however, the resilient ring 50 is made of a material which offers resistance at any increasing rate to progressive increments of deflection or distortion under increasing load. A material having such characteristics is shown and described in U.S. Patent No. 2,687,269, granted August 24, 1954, to Titus et al., and in U.S. Patent No. 2,687,270, granted August 24, 1954, to C. S. Robinson. Such material is compressible, as distinguished from rubber and similar elastomers, and it has a response to increasing deflection or compression which is non-linear, as distinguished from the substantially linear response of ordinary springs or of rubber and similar elastomers. For the purposes of the present invention the resilient ring 50 may comprise a pre-compressed mass of compacted metallic wires extending in various directions and contacting one another at innumerable points within the body of the cushion so that the short strands of wire between such points act as springs while the points of contact act as frictional snubbers to produce in the aggregate a metallic cushion whose modulus of elasticity changes markedly under increasing vibratory amplitude or under increasing load so as to reduce amplitude at resonance and to afford the non-linear response to increasing deflection as referred to above. Specifically the ring 50 may be made by knitting a tubular body from metal wire, such as stainless steel or beryllium copper, and rolling a suitable length of such tube upon itself, like one rolls a stocking, to form a doughnut-shaped body. The body is then pressed in a die to form a ring having a substantially rectangular cross-section. The amount of wire used and the amount of pre-compression applied may be chosen at will to provide rings 50 having any desired degree of resilience ranging from quite soft and readily distortable to quite hard and distortable only under severe loading.

It is preferred to utilize a ring 50 made of metal wires and pre-compressed as described above to a degree suitable for a particular set or range of loading and shock conditions and to make the ring 50 of such thickness, in a vertical direction as viewed in FIG. 1, that it must be further compressed under a vertical load to assume the relative vertical thickness illustrated in FIG. 1 wherein the mounting device of the present invention is shown as it would appear under the static vertical load for which it is designed. In this manner the still-further compressible ring 50 will support a substantial portion of the vertical load thus relieving the pressure, under static conditions at least, upon the bearing balls 30.

The annular recesses 46 and 48 are preferably formed with diverging vertical walls so that upon lateral displacement between the plates 10 and 12, the ring 50 may be distorted diagonally as viewed in FIG. 1. Thus, for example, upon displacement of the plate 12 horizontally toward the right as viewed in FIG. 1, the ring 50 will be distorted in such manner that the left-hand vertical wall thereof may move toward the diverging wall of the annular recess 48 and the right-hand vertical wall of the cushion 52 will be displaced toward the diverging wall of the annular recess 46. The diverging walls have been found to be of advantage in connection with the preferred compressible metal wire cushioning and damping material just described. Obviously the diverging walls are essential when the ring 50 is made of some incompressible material such as rubber and the like which must be afforded a space into which it may flow.

When the ring 50 is made of the preferred metal wire mass the distortion thereof as a result of generally horizontal displacement between the load bearing plate 12 and base plate 10 will serve to damp and contribute to the control of the response of the mounting to shock and vibratory forces which have a horizontal component. This is true, whether or not the ring 50 is also so designed as to partially support the vertical load upon the mounting.

It will be understood that the foregoing detailed description of preferred forms of the present invention has been presented in an illustrative, rather than in a limiting, sense and that modifications and variations may be made therein without departing from the scope of the claims.

I claim:

1. In a vibration and shock isolating mounting for objects such as machinery and the like, the combination of a base plate adapted to rest upon a floor, a load supporting plate upon which the object to be supported may rest, a pair of circular raceways each comprising an inwardly curved trough with a low point approximately centrally of the width thereof and inclined surfaces leading from said low point to high points at the outer edges of said trough, said raceways being secured in opposed relation respectively to said base plate and said load supporting plate, a plurality of bearing balls each having a diameter substantially smaller than the width of said troughs, said bearing balls being arranged in spaced relation in circular array throughout the diameter of said raceways and serving to support said load supporting plate upon said base plate, one of said plates having a circular opening of predetermined diameter extending therethrough, a cylindrical boss fixed upon the other of said plates, said boss having a diameter less than the diameter of said opening and said boss extending through said opening to serve with said opening as stop means for limiting to substantially identical extents the amplitude of relative movement in any horizontal direction between said base plate and said load supporting plate, and resilient means connected with said base plate and said load supporting plate for yieldably resisting any horizontal movement between said base plate and said load supporting plate.

2. In a vibration and shock isolating mounting for objects such as machinery and the like, the combination of a base plate adapted to rest upon a floor, a load supporting plate upon which the object to be supported may rest, a pair of circular raceways each comprising an inwardly curved trough with a low point approximately centrally of the width thereof and inclined surfaces leading from said low point to high points at the outer edges of said trough, said raceways being secured in opposed relation respectively to said base plate and said load supporting plate, a plurality of bearing balls each having a diameter substantially smaller than the width of said troughs, said bearing balls being arranged in spaced relation in circular array throughout the diameter of said raceways and serving to support said load supporting plate upon said base plate, one of said plates having a circular opening of predetermined diameter extending therethrough, a cylindrical boss fixed upon the other of said plates, said boss having a diameter less than the diameter of said opening and said boss extending through said opening to serve with said opening as stop means for limiting to substantially identical extents the amplitude of relative movement in any horizontal direction between said base plate and said load supporting plate, and a yieldable cushion made up of a multitude of springy metal wires compressed into a firm body having sharply increasing resistance to increasing deformation connected with said base plate and said load supporting plate to yieldably resist and damp any horizontal movement between said base plate and said load supporting plate.

3. In a vibration and shock isolating mounting for objects such as machinery and the like, the combination of a base plate adapted to rest upon a floor, a load supporting plate upon which the object to be supported may rest, a pair of circular raceways each comprising an inwardly curved trough with a low point approximately centrally of the width thereof and inclined surfaces leading from said low point to high points at the outer edges of said trough, one of said raceways being fixed with respect to said base plate and the other of said raceways being fixed with respect to said load supporting plate, and said raceways being arranged in opposed relation, a plurality of bearing balls each having a diameter substantially smaller than the width of said troughs, said bearing balls being arranged in spaced relation in circular array within said raceways to rest upon the base plate raceway and to support load supporting plate through contact of said balls with the supporting plate raceway, and a yieldable cushion made of a compressed metal wire fabric for yieldably resisting and damping any horizontal movement between said base plate and said load supporting plate, said cushion being annular in shape and being seated concentric with said raceways in annular recesses formed respectively in said base plate and said load supporting plate.

References Cited in the file of this patent

UNITED STATES PATENTS

| | | |
|---|---|---|
| 2,062,807 | Cramer | Dec. 1, 1936 |
| 2,414,506 | Bowen | Jan. 21, 1947 |
| 2,680,585 | Crede | June 8, 1954 |
| 2,867,472 | Harper | Jan. 6, 1959 |
| 2,983,121 | Naas | May 9, 1961 |

FOREIGN PATENTS

| | | |
|---|---|---|
| 1,239,990 | France | July 25, 1960 |